DONALD L. HENRY
INVENTOR.

United States Patent Office 3,447,678
Patented June 3, 1969

3,447,678
METHOD FOR SEPARATING EXPANDED PERLITE WITH MINIMUM PARTICLE BREAKAGE
Donald L. Henry, 12208 Park Ave.,
Santa Fe Springs, Calif. 90670
Filed Apr. 20, 1967, Ser. No. 632,440
Int. Cl. B07b 7/04; B03d 3/00
U.S. Cl. 209—3
3 Claims

ABSTRACT OF THE DISCLOSURE

Expanded perlite is stratified in a pneumatic conduit and the stratified suspension is introduced into a baffle-type pneumatic separator wherein coarse expanded perlite particles settle. Due to the pre-stratification, abrasion of the expanded perlite by the baffle is avoided. The coarse-free suspension is separated into a fines perlite fraction and a dust suspension in a cyclone. Dust is subsequently separated from the dust suspension whereby three sizes of perlite are obtained.

BACKGROUND OF THE INVENTION

Field of the invention

This invention is directed to a method and apparatus for processing perlite and is particularly directed to the area of perlite processing concerned with the separation of expanded perlite, by size, from a pneumatic stream. A classifier is used to separate out the coarse particles, a cyclone is used to separate out the fine particles and a dust collector is used to separate out the very fine dust.

Description of the prior art

The prior art expands perlite in the same manner, with the same equipment and process as the present process. Following this expansion, the prior art separates the expanded perlite from a gas stream by means of a cyclone separator. This cyclone separator separates out both coarse and fine expanded perlite, which is packaged together. However, the cyclone separation produces a harmful effect upon the perlite in the gas stream. In such cyclone separators, the perlite moves to the outside wall and rubs upon the outside wall. This causes abrasion of the perlite. The abrasion in turn breaks down the perlite by knocking off the sharp edges and by breaking the large pieces into smaller particles. Thus, more dust is produced to reduce the useable perlite yield, and the perlite removed from the gas stream by the cyclone separator is a mixture of both fine and coarse particles.

SUMMARY OF THE INVENTION

The perlite processing method and apparatus of this invention comprises conventional means to expand perlite, followed by means for separation of the perlite from the gas stream. This separation of means comprises three separate separators. First, the unclassified perlite, carried in a gas stream, passes through a classifier. This classifier removes the coarse particles from the stream in such a way that the perlite does not impinge upon the classifier structure, and thus eliminates the abrasion which results in breaking down the expanded perlite. The gas stream from the classified passes through a cyclone separator. This conventional cyclone separator separates out the fine particles of expanded perlite from the stream. The gas from the cyclone separator carries perlite dust, part of which is produced in the furnace, and part of which is produced in the cyclone separator by the abrasion of the fine expanded perlite particles with the cyclone separator walls. The dust separator separates out the dust to discharge clean gas to the atmosphere and dust to a suitable receptacle.

The classifier added to the normal perlite processing apparatus by this invention provides a first important characteristic of separating out the coarse expanded perlite particles without abrasion upon the classifier walls. This produces more useable perlite, and produces coarse expanded perlite. The second important advantage of placing the classifier of this invention in the conventional process is the production of two sizes of useable perlite. Now, rather than having all useable perlite produced at one output, the useable perlite is produced in coarse and fine sizes at sepaarte outputs.

Therefore, it is an object of this invention to provide a method and apparatus for perlite processing which produces two sizes of the useable perlite. It is a further object of this invention to provide a classifier in perlite processing which separates out useable perlite without impingement of the perlite upon the classifier walls and thus without abrasion, breakdown and production of dust from the coarse expanded perlite. It is another object of this invention to provide a method and apparatus for perlite processing which is economic of construction, of long life and is of easy use so that it improves the production of perlite without unnecessary complications and expenses. Other objects and advantages of this invention will become apparent from a study of the following portion of this specification, the claims and the attached drawings.

DESCRIPTION OF THE PREFERRED EMBODIMENT

Figure 1:
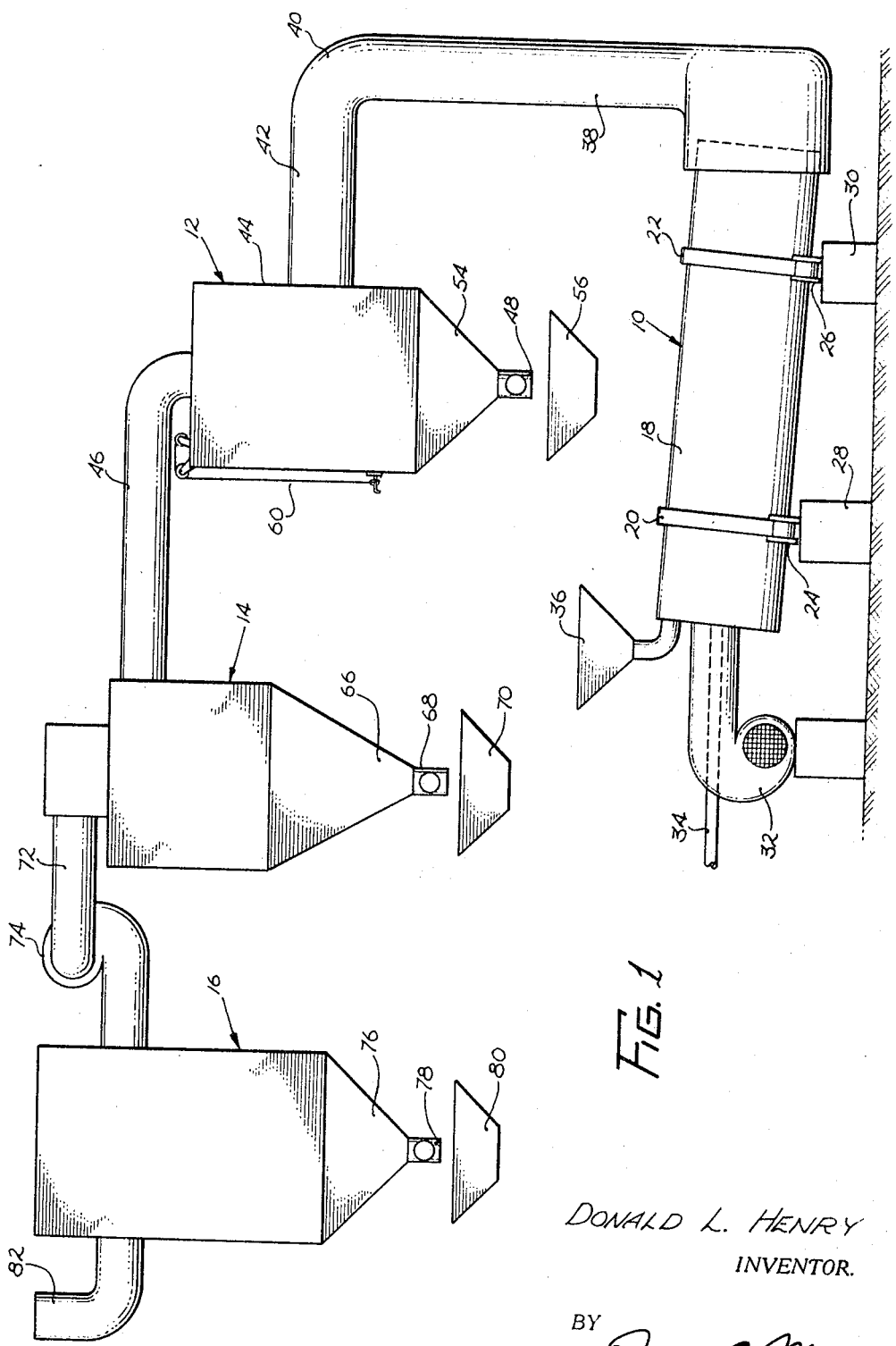
FIGURE 1 is a schematic side elevational view of perlite processing equipment, showing the classifier of this invention in the process stream.

Referring principally to FIGURE 1, the entire processing equipment for the expanding and separating of perlite is shown therein. A perlite expanding furnace is generally indicated at 10. The furnace offtake discharges the products from the perlite furnace 10 to the classifier 12 of this invention. The gaseous products and the solids still carried in the gaseous products are discharged from the classifier 12 to cyclone separator 14. The gaseous products from the cyclone separator 14 and the dust carried therein are carried to dust collector 16.

Referring again to the perlite furnace 10, it comprises a substantially horizontal but slightly downwardly inclined drum 18. Drum 18 is conventionally lined with fire brick, or other suitable lining. Drum 18 is rotated by conventional means to provide tumbling of the load charge therein and to expose the raw material in the drum load to the radiant heat from the fire within the drum.

Fan 32 supplies combustion air to the drum for the maintenance of the fire therein and supplies sufficient air so that expanded perlite produced in the drum is conveyed by the mixture of combustion gases and excess air out of the perlite furnace 10. Fuel line 34 provides fuel for combustion and terminates in the burner head in the inlet end of drum 18. Suitable combustion controls are provided so that the proper fire is maintained for optimum expandeed perlite production. Raw material feed hopper 36 feeds the raw material at an appropriate rate into the inlet end of the drum for the flame treatment which produces the expanded perlite. Thus, expanded perlite is produced by perlite furnace 10 and the expanded perlite is carried by the gas stream out of the right end of the drum through offtake 38.

The perlite furnace 10 is illustarted as a conventional horizontal furnace. Instead, it may be a conventional vertical furnace. Furthermore, in the case of perlites which do not readily expand by simple application of heat, instead of the perlite furnace 10, perlite production equipment which involves batching of raw material and subjecting the raw material to heat and reduction of pressure, can be alternatively used. Some of the raw materials require the pressure reduction for proper expansion and such is contemplated by this invention. Thus, the perlite furnace 10 is any conventional means for producing expanded perlite and the offtake 38 is a gaseous conveyor for conveying the expanded perlite particles to the classifier 12. Offtake 38 is preferably vertical to prevent the settling of the expanded perlite carried in the gas stream to the lower side of a horizontal offtake run. Thus, the perlite is fairly uniformly mixed across the cross section of offtake 38 and is in such condition when the perlite in the gas stream reaches elbow 40. Horizontal inlet tube 42 extends from elbow 40 to the inlet sidewall 44 of classifier 12. Inlet tube 42 is horizontal and is of such length, when compared to the velocity of the material flow therethrough, that some settling of the perlite occurs in this portion of the material stream. Preferably, there is enough turbulence along the lower wall of inlet tube 42 to prevent any substantial amount of abrasion by the expanded perlite particles thereon. However, at least the coarse expanded perlite particles settle away from the top wall of inlet tube 42 to provide a layer at the top wall which is free of fine and coarse expanded perlite particles, but which may carry some dust. This stratification is desirable for the next step.

Figure 2:
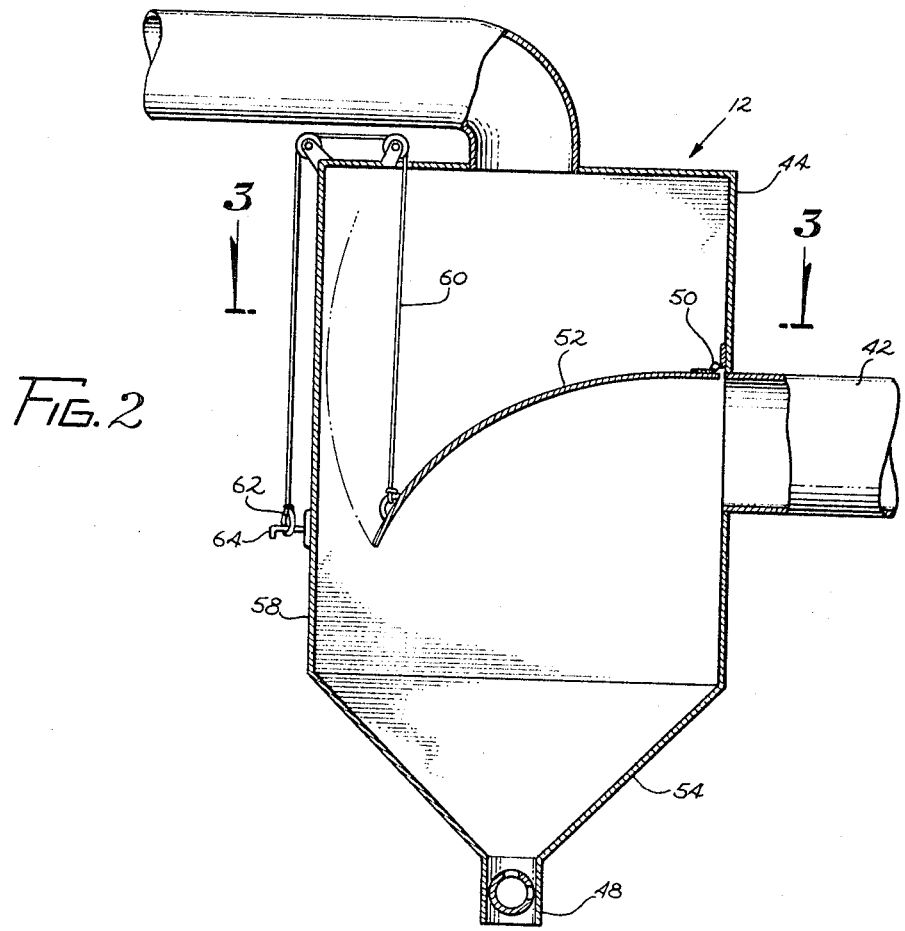
FIGURE 2 is an enlarged vertical section through the classifier of this invention.
Figure 3:
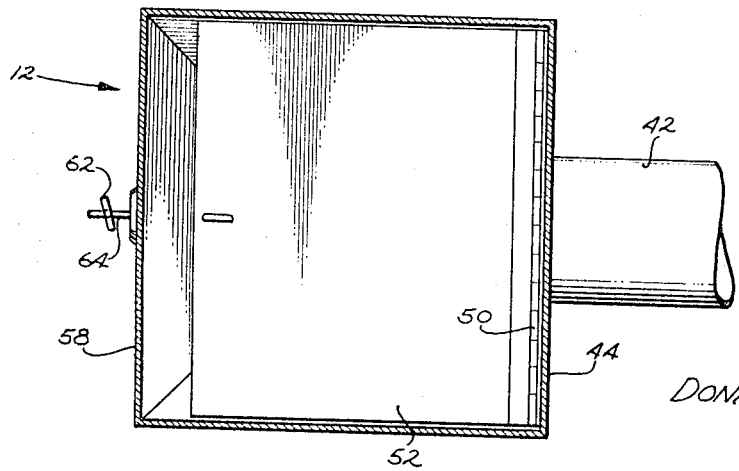
FIGURE 3 is a section taken generally along line 3—3 of FIGURE 2.

Referring principally to FIGURES 2 and 3, classifier 12 is a closed vessel except for inlet tube 42, outlet tube 46 and coarse expanded perlite outlet 48. Classifier 12 may be of either circular or rectangular shape, but it is preferably of substantially square horizontal cross-section as is shown in FIGURE 3. Mounted upon the inside of inlet sidewall 44, directly above inlet tube 42 is hinge 50. Mounted on hinge 50 is curved deflector plate 52. Deflector plate 52 closely adjoins the walls in the direction axially at a hinge, but it is sufficiently free that it may be adjusted upward and downward upon the hinge 50. Curved deflector plate 52 is preferably substantially parabolic. Thus, the inlet material is deflected downward by curved deflector plate 52. Since the perlite in inlet tube 42 is somewhat stratified, there is a layer of gas moving against deflector plate 52 which is free of fine and coarse expanded perlite particles. Thus, there is no abrasion by the useable perlite in the gas stream upon deflector plate 52. This absence of abrasion prevents breaking down of the larger particles and it prevents the production of further dust. Deflector plate 52 is positioned so that coarse perlite particles are dropped out of the gas stream into hopper 54 which forms the bottom of classifier 12. Coarse expanded perlite particles are discharged out of coarse outlet 48 into storage hopper 56 and are subsequently bagged or otherwise transported.

The gas velocity between the end of curved deflector plate 52 and sidewall 58 is sufficient to carry fine expanded perlite particles and dust out of the classifier 12 and through outlet tube 46. Adjustment of deflector plate 52 is accomplished by cable 60 which passes over appropriate pulleys. The outer end of cable 60 carries ring 62 which can be engaged upon a suitable hook 64, or the like, to secure the end of cable 60. If desired, a plurality of hooks 64 can be provided to position curved deflector plate 52 in any desired position of rotation upon its hinge 50. When curved deflector plate 52 is raised, less gas stream deflection is caused by the plate and the opening between the end of the plate and sidewall 58 is narrower, causing increased gas velocity therethrough, and therefore fewer of the larger particles are dropped out. Lowering of the plate has opposite action. Thus, adjustment of deflector plate 52 controls the size of expanded perlite dropped into hopper 54.

Outlet tube 46 forms the inlet to cyclone separator 14. Outlet tube 46 thus carries the gas stream and the suspended perlite particles therein which now comprise fine expanded perlite and dust. Cyclone separator 14 is of conventional construction and is of the character generally used in this service. It acts by centrifugal action wherein the heavier materials move toward the outer shell of the cyclone separator and the lighter materials toward the inside. Since expanded perlite has a greater density than that of the gas stream, it moves toward the outside shell of the cyclone separator and collects in the hopper 66 of the cyclone separator. Periodically, the hopper is discharged through fine expanded perlite outlet 68 to hopper 70 from whence it is bagged or otherwise moved to the point of use. Cyclone separator 14 is arranged in such a manner that useable fine expanded perlite particles are dropped out in the separator but nonuseable dust is discharged through its outlet tube 72. Fan 74 moves the perlite dust and gas in outlet tube 72 to dust collector 16.

Dust collector 16 is also of conventional construction and has a dust hopper 76 from which perlite dust is discharged through dust outlet 78 to dust storage hopper 80. The dust is periodically removed from dust storage hopper 80 and is disposed of. Furthermore, dust collector 16 has a clean air outlet 82 from whence the gases are discharged to atmosphere. Dust collector 16 may be of any conventional nature and may be a bag type dust collector or, if desired, may be electronic or of water-wash nature.

From this construction, it can be seen that the introduction of classifier 12 into the process flow provides for separation of the expanded perlite into two size categories. By adjustment of deflector plate 52, classification between the quantities of coarse and fine expanded perlite particles can be accomplished. Furthermore, two sizes of expanded perlite particles are now available. Additionally, since there is no impingement by the coarse particles of the sidewalls or any portion of the equipment while the coarse particles are carried in the gas stream, there is lesser breakdown of the particles due to such abrasion to improve the net production of this whole facility.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed:

1. The process of producing expanded perlite comprising the steps of:
   heating raw material feed to produce expanded perlite particles;
   conveying said particles in a pneumatic stream, the improvement comprising:
   separating coarse expanded perlite particles from the pneumatic stream by directing the pneumatic stream into a vessel and deflecting the pneumatic stream downward within the vessel so that coarse expanded perlite particles are dropped out of the pneumatic stream into the bottom of the classifier vessel and fine expanded perlite particles and perlite dust are carried out of the classifier vessel by re-direction of the pneumatic stream;
   said separating step is preceded by:
   passing the pneumatically conveyed perlite particles through a substantially horizontal tube immediately prior to passing the pneumatically conveyed perlite particles into the classifier vessel to cause some stratification of the perlite particles within the pneumatic stream; and said deflecting step includes positioning a downwardly curved deflector plate over the inlet of the pneumatic stream into the classifier vessel so that the stratified portion of the pneumatic stream having a minimum of perlite particles therein moves against the deflector plate to minimize abrasion of useable perlite particles on the deflector plate.

2. The process of claim 1 wherein the classifier step is followed by:

separating fine expanded perlite particles from the pneumatic stream in a cyclone separator.

3. The process of claim 2 including the further step of separating dust from the pneumatic stream in a dust collector; and discharging the pneumatic stream to atmosphere.

References Cited
UNITED STATES PATENTS

| | | | |
|---|---|---|---|
| 2,724,484 | 10/1951 | Howle | 263—21 |
| 2,607,782 | 7/1952 | Zoradi. | |
| 2,968,400 | 1/1961 | Clute | 209—143 |

FRANK W. LUTTER, *Primary Examiner.*

U.S. Cl. X.R.

209—11, 12, 143, 144